United States Patent Office 2,777,961
Patented Jan. 15, 1957

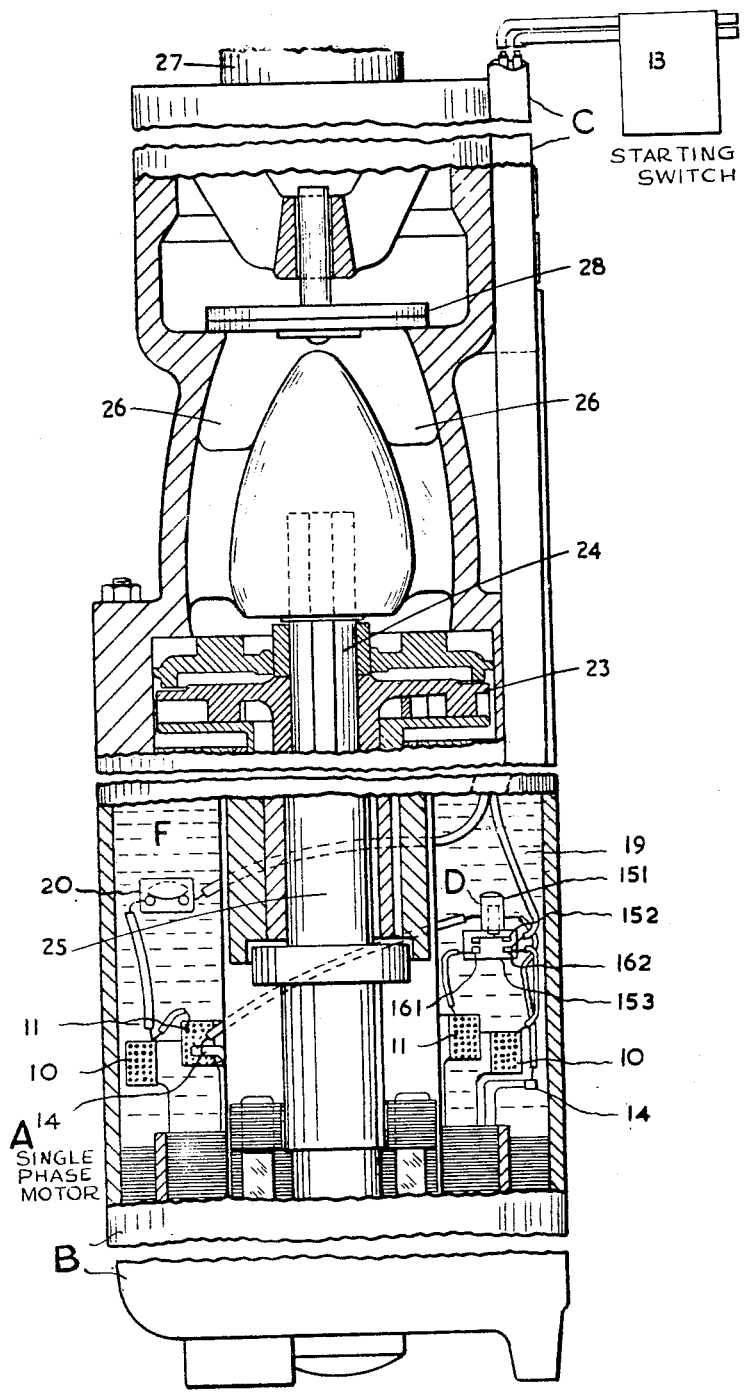

2,777,961

SUBMERSIBLE ELECTRICALLY DRIVEN PUMPS

Thomas Edward Penlington, Birmingham, England, assignor to Beresford & Son Limited, Birmingham, England, a limited liability company of Great Britain Application July 29, 1953, Serial No. 371,027

Claims priority, application Great Britain May 26, 1953

1 Claim. (Cl. 310—86)

This invention has reference to improvements relating to submersible electrically driven pumps.

Since submersible electrically driven pumps are required to work submersed in wells or boreholes it is imperative that both the pumps and motors should operate with the greatest reliability since in the event of failure it is necessary to raise the whole of the unit to the surface for investigation and repair.

Further it is desirable that the electric motor should have a high starting torque and that installation should be as simple as possible since submersible electrically driven pumps are required frequently to be installed and to operate in remote places where highly skilled labour is not readily available.

It is a common practice with electrically driven pumps to employ single phase motors of the capacitor-start and capacitor-start-capacitor-run types and to locate the starter and condensers at the surface and to conduct the electric current to the electric motor by way of a 3-core cable.

In connection with a submersible electrically driven pump employing a single phase induction type electric motor with a squirrel cage rotor however, it has been proposed to locate a phase shifting reactance in the underside of the frame of the electric motor so that the said phase shifting reactance device is submersible with the electric motor and to control the circuit through the said reactance by a centrifugal switch installed in the frame and responsive to the speed of the rotor so that when the centrifugal switch is closed at least a part of the reactance of the reactance of the reactance device is short circuited and to conduct the electric current to the electric motor by way of a 2-core cable.

The present invention has for its object to provide an improved submersible electrically driven pump which incorporates an electric motor which possesses a high starting torque, which is relatively cheap to manufacture, which does not require the use of condensers and which is controlled by an electrically operated contrivance submersible with the motor.

According to the invention the improved submersible electrically driven pump incorporates in combination a single phase split phase electric motor, an electrically operated contrivance contained within the motor casing and submersible therewith for controlling the electric circuit through the starting winding of the said electric motor and provision for conducting electric current to the motor by way of a 2-core cable.

The invention will now be described with particular reference to the accompanying drawing which is a view partly in elevation and partly in section showing somewhat diagrammatically a Beresford submersible electrically driven pump embodying the invention, sufficient only of the pump section being shown as is necessary to an understanding of the invention.

As illustrated the electric motor designated generally by the reference letter A is contained within a submersible casing B with which is associated in unitary assembly the casing of a submersible centrifugal pump unit, not shown, which is required to be driven by the electric motor A.

The electric motor A is of the single phase split phase type the main winding being denoted by the reference numeral 10 whilst the starting winding is denoted by the reference numeral 11.

The electric current is conducted to the motor A from the main leads 12 by way of a starter 13 of known kind and a 2-core cable denoted generally by the reference letter C.

In addition to the usual main winding 10 and starting winding 11 aforesaid the electric motor is wound with a third winding 14 herein termed the search winding 14, one coil side of which is wound in a coil slot containing a coil side of the main winding whilst the other coil side of the search winding 14 is wound in a slot containing a coil side of the starting winding 11.

The aforesaid manner of winding the search coil 14 results in the E. M. F. which is generated by reason of the inductive relationship between the coil side wound in a slot in the main winding 10 being opposed to the electromotive force generated in the coil side which is in inductive relationship with the starting winding 11 on starting and up to running speed.

These opposed or "bucking" E. M. F.'s as they are termed give rise to a resultant E. M. F. which when the electric motor is running at or in excess of a prescribed speed is considerably higher than the resultant E. M. F. induced on the instance of starting as and for a purpose to be described hereinafter.

The search coil 14 is associated with the coil 151 of an electromagnetic relay designated generally by the refernce letter D the contact making and breaking member 152 of which cooperates with contacts 161, 162, the contact 161 being connected to the starting winding 11 whilst the contact 162 is connected to the main winding 10 and to one of the leads of the 2-core cable C.

The contact making and breaking member 152 tends always to remain in the contact making position under the action of gravity.

The electromagnetic relay D is designed so that the critical operating voltage or amperage is greater than the resultant E. M. F. generated in the search coil 14 on the instance of starting but less than the resultant E. M. F. induced in the search coil when the motor attains or is running in excess of a predetermined speed.

Since there is a marked potential difference between the resultant E. M. F. induced in the search coil 14 on starting and the resultant E. M. F. induced in the said coil when the motor is running at or in excess of a prescribed speed and since the said resultant E. M. F. on starting is less than the critical operating voltage or amperage of the relay D, the contact making and breaking member 152 on starting remains in the contact making position so that the circuit through the starting winding 11 is maintained closed whilst, when the motor attains and is running at or above the prescribed speed, the coil 151 is energized to an extent such that the contact making and breaking member 152 is caused to open circuit the starting winding 11.

The main winding 10, the starting winding 11 and the search winding 14 are all enclosed in a sealed stator chamber F which is filled with transformer oil 19.

Located within the said stator chamber F and immersed in the transformer oil 19 is an electromagnetic relay D the contacts 161 and 162 and the contact making and breaking member 152 whereof are enclosed within a fluid tight chamber 153 whilst the coil 151 is exposed to the cooling influence of the transformer oil 19. Included in the circuit from the main line to the main winding 10 is a snap action bimetallic overload switch 20, such switch being housed within the casing B and immersed in the liquid coolant 19, so that should the coolant overheat, the switch 20 will be actuated to break the circuit.

The pump section of the Beresford electrically driven pump incorporates a plurality of centrifugal pump units which are arranged in superposed relationship and bolted to the upper end of the casing B of the motor A but since a detailed description of the said pump section is not necessary to an understanding of the invention only the uppermost part of the pump section is depicted in the figure, and it will suffice for present purposes to state that the part of the pump section illustrated shows a pump unit incorporating an impeller 23, which as is the case also of the impellers of the other pump units which are not illustrated is fixed to a common driving shaft 24 which itself is coupled to the rotor shaft 25 of the electric motor A.

The common output of the pump units is discharged by way of the passage 26 into the common riser pipe 27 under the control of a one way valve 28.

If desired a search winding 14 employing more than one coil may be used in which event in order to obtain the requisite "bucking" E. M. F. that the search winding incorporates a coil or coils which or each of which is wound in slots which contain the main winding 10 and a coil or coils which or each of which is wound only in slots which contain the starting winding 11 with the coil or coils wound in the slots containing the main winding connected to the coil or coils wound in the slots containing the starting winding so that the E. M. F.'s induced in the respective coils are "bucking" E. M. F.'s and give rise to a resultant E. M. F. which on starting is less than the critical operating voltage or amperage of the electromagnetic relay D but which is considerably greater than the said starting E. M. F. and in excess of the critical operating voltage or amperage of the electromagnetic relay D when the motor attains a prescribed speed. Further if desired a bi-metallic switch or other electrical contact making and breaking contrivance may be used in place of the electromagnetic relay D.

It should be appreciated that the selection of a single phase split phase electric motor as the driving means for a submersible electrically driven pump affords an electric motor which:

(a) Has a good starting torque.

(b) Is cheaper to wind since types of winding can be used which can be performed quickly and cheaply by machines.

(c) Does not require condensers, and (d) Lends itself easily to the inclusion of a snap action bi-metallic thermostatic overload switch of the type which can be matched to the thermal characteristics of the motor, with the attendant possibility that in some cases it may be possible to dispense with the starter whilst the control of the starting winding circuit by means of an electrical contrivance which is disposed within the motor casing (a) dispenses with the use of a centrifugal switch and analogous mechanical mechanism and (b) permits the use of a 2-core cable for conducting the electric current from the surface with the attendant advantages of simplification of connection to the starter and cheapness by substituting a cable having two cores instead of three.

In conclusion it may be mentioned that the electromagnetic relay D forms the subject of our co-pending patent application Serial No. 371,024 filed July 29, 1953, now Patent No. 2,742,597, whilst a submersible electrically driven pump incorporating an electric motor of the single phase split phase type in which the stator chamber of the motor is filled with transformer oil or other coolant and in which there is disposed within the said stator chamber an electromagnetic relay D for the control of the starting winding 11 of the single phase split phase electric motor aforesaid the contacts 161, 162 and contact making member 152 of which are enclosed within a fluid-tight chamber 153 with the coil 151 exposed to the cooling action of the coolant 19, forms the subject of our co-pending patent application Serial No. 371,026 filed July 29, 1953.

The present application is a continuation-in-part of prior application Serial No. 296,565, filed July 1, 1952, and now abandoned in favor of the present application.

I claim:

A submersible electrically driven pump incorporating in combination a pump section and an electric motor section which itself embodies in combination a submersible casing, a single-phase-split-phase electric motor which is contained within said casing and which has a main winding, a starting winding and an auxiliary winding which is always in inductive relationship at least with the main winding, a liquid tight chamber which is sealed from the space occupied by the rotor of the electric motor which is filled with a liquid coolant, a gravity operated electrical contact making and breaking contrivance for controlling the electric circuit through the starting winding of the electric motor, said contrivance being normally closed and being contained within said liquid chamber and immersed in the liquid coolant therein and which derives its energising electromotive force from the electromotive force generated in said auxiliary winding, said contrivance being adapted to break said circuit to said starting winding after said motor attains operating speed, a thermo actuated switch in circuit with said main winding, said switch being immersed in said liquid coolant and being adapted to break the circuit to said main winding upon overheating of said coolant, and a control means for the electric motor which is adapted to be located at the surface and provision for connecting the said control means to the main winding by way of a 2-core cable which is led into the liquid tight chamber aforesaid.

References Cited in the file of this patent

UNITED STATES PATENTS

| | | |
|---|---|---|
| 1,269,909 | Cooper | June 18, 1918 |
| 1,991,035 | Werner | Feb. 12, 1935 |
| 2,132,888 | Werner | Oct. 11, 1938 |
| 2,419,159 | Pezzillo | Apr. 15, 1947 |
| 2,518,597 | Brooks | Aug. 15, 1950 |
| 2,539,048 | Arutunoff | Jan. 23, 1951 |

FOREIGN PATENTS

| | | |
|---|---|---|
| 494,601 | Great Britain | Oct. 28, 1928 |
| 116,231 | Australia | Dec. 1, 1942 |